Patented May 2, 1939

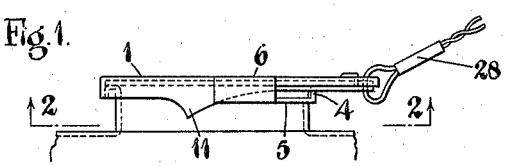
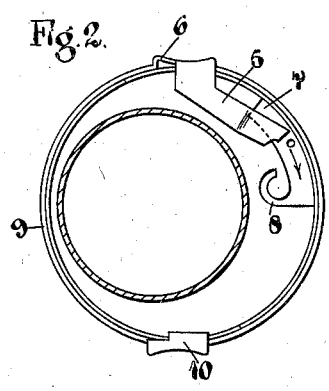
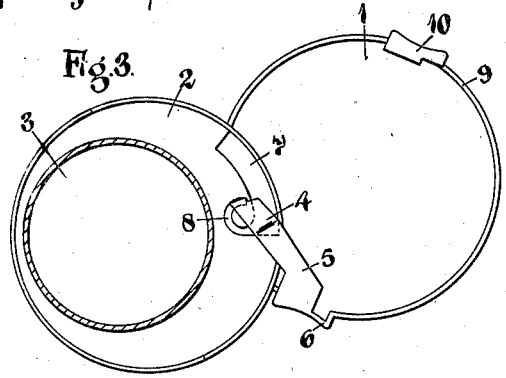
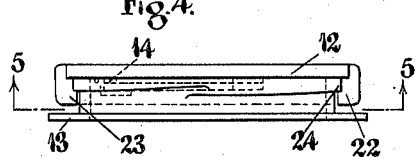
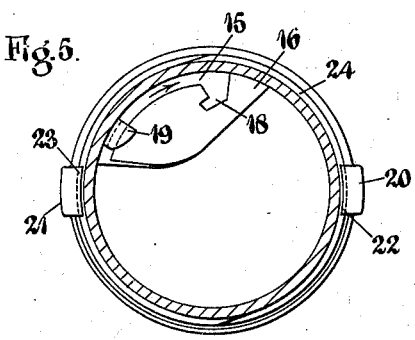

2,156,837

UNITED STATES PATENT OFFICE 2,156,837

CLOSURE ELEMENT FOR CANISTERS AND LIKE VESSELS

Thomas Henry Bradbury, Birmingham, England, assignor to Phillips Telescopic Tops Limited, London, England, a British company Application May 17, 1937, Serial No. 143,191
In Great Britain May 23, 1936

4 Claims. (Cl. 220—38)

This invention is for improvements in or relating to a closure element for the aperture of a liquid or like container, for example a canister, and has for its object the provision of a combined closure element and valve which is entirely constructed from sheet metal and is therefore simple in design and cheap to manufacture. The device moreover differs from known constructions of closure elements of the type having a lateral pivot and capable of axial movement to seal the orifice in that accurate and expensive machine operations, such as screw-threading, are obviated. The element combines the function of a closure member and valve with the particular advantage that any individual part of the element is not normally detachable from the container and consequently cannot be mislaid, as is the case with screw-stoppers, press-caps and other similar devices. In the case of the device which constitutes the subject matter of the present invention an individual part of the element can only be detached by removing an effective part and destroying the article as a whole.

According to the present invention there is provided a combined closure element and valve for, or for use upon, a liquid or like container, which comprises two sheet metal elements one element having an aperture therein and the other element comprising a disc pivotally mounted upon the said first element at a point adjacent to the periphery of the aperture and the disc so as to be movable in the plane of the disc about the said pivot into a position to cover the said aperture, and to be thereafter movable in the plane of the disc about the axis thereof, and relatively to the said first element through which the pivot extends in an arcuate slot disposed adjacent to and concentric with the aperture therein, the disc being provided at the periphery thereof with elements arranged to engage with inclined projections upon the said first element, to effect a liquid-tight engagement between the effective boundary of the aperture and the said disc.

In one embodiment of the invention the disc is provided at the periphery thereof with a pair of diametrically opposed lugs arranged to engage with inclined projections upon the first element.

Still further according to the invention there is provided a combined closure element and valve for, or for use upon, a liquid or like container, which comprises two sheet metal elements one element having an aperture therein and the other element comprising a disc pivotally mounted upon the said first element at a point adjacent to the periphery of the aperture and the disc so as to be movable in the plane of the disc about the said pivot into a position to cover the said aperture, and to be thereafter movable in the plane of the disc about the axis thereof, and relatively to the said first element through which the pivot extends in an arcuate slot disposed adjacent to and concentric with the aperture therein, with a U-shaped extension to said arcuate slot in which the pivot is retained during the pivotal movement, the disc being provided at the periphery thereof with elements arranged to engage with inclined projections upon the said first element, to effect a liquid-tight engagement between the effective boundary of the aperture and the said disc.

The invention is more particularly described with reference to the accompanying drawing, in which:

Figure 1 illustrates in side elevation a closure element constructed in accordance with the present invention;

Figure 2 illustrates an underside plan view on the line 2—2 of Figure 1;

Figure 3 illustrates an underside plan view of Figure 1 with the disc removed so as to uncover the aperture in the closure element;

Figure 4 illustrates a modified arrangement of a closure element constructed in accordance with the present invention;

Figure 5 is an underside plan view along the line 5—5 of Figure 4;

Referring to Figures 1, 2 and 3 of the drawing a sheet metal disc 1 is pivotally connected to a sheet metal member 2 having an aperture 3 formed therein. The pivotal connection between the disc 1 and the member 2 comprises a pin 4 carried upon the end of a strip metal arm 5 secured to a lug 6 arranged to depend from the periphery of the disc 1. The pin 4 extends through an arcuate slot 7 formed in the member 2, the said arcuate slot being arranged to terminate in a U-shaped slot 8 formed in the said member for a purpose hereinafter described. The disc 1 is provided around one half of the periphery thereof with a flange 9 of such a depth as to engage with the periphery of the member 2 when the disc 1 is moved from the position shown in Figure 3, to that illustrated in Figure 2. Diametrically opposed to the lug 6 formed on the disc 1 is a second lug 10 each of the said lugs being provided with an inwardly extending flange which when the disc is moved so as to cover the aperture 3 formed in the member 2, the said lugs underlie the periphery of the said member. If when the disc is in this position it is given a part rotational movement into the position illustrated in Figures 1 and 2, the inwardly directed flanges of the lugs 6 and 10 engage with inclined projections 11 formed on the member 2 in such a manner as to cause the disc 1 to be drawn into engagement with the member 2, thus forming a liquid-tight engagement with the portions of the member 2 with which the disc engages and which constitute the effective boundary of the aperture 3.

Referring to Figures 4 and 5, a disc 12 is mounted upon a flanged member 13 having an aperture formed therein. Mounted upon the disc 12 at a point adjacent to the periphery thereof is a pin 14 which extends into an arcuate slot 15 formed in a member 16 carried by the flanged member 13. The member 16 constitutes substantially a chord of the aperture in the flanged member and is provided therein with the arcuate slot 15 hereinbefore referred to, which at one end thereof is provided with a substantially U-shaped radial extension 18 into which the pin 14 extends when the disc has completed its rotational movement and is about to commence its pivotal movement to uncover the aperture and the flanged member 13. The pin 14 is provided with a shoe 19 which maintains the disc 12 in pivotal connection with the member 13. A flange extends around substantially half of the periphery of the disc 12 which engages with the flange of the member 13 when in the closed position but permits the disc 12 to be rotated during the pivotal movement in only one direction relatively to the member 13. At diametrically opposite points of the said discs there are provided a pair of lugs 20 and 21 having inwardly extending flanges 22 and 23 so arranged that when the disc 12 has been moved to cover the aperture in the member 13 the inwardly directed flanges 22 and 23 lie in the path of inclined projections in the form of helical projections 24 upon the flange of the member 13 so that a rotational movement of the disc 12 causes the flanged member and the disc to be drawn into liquid-tight engagement with one another.

The operation of the closure elements illustrated in Figures 1 to 5 is similar and will be described with reference to the closure element illustrated in Figures 1 to 3. When the disc member 1 is rotated about its axis, the pin 4 moves in the arcuate slot 7 until it engages with the end thereof in which position it will be found that any attempt to continue the rotational movement of the disc 1 will cause the pin 4 to move into the U-shaped slot 8 and so draw the flanges on the depending lugs 6 and 10 out of engagement with the periphery of the member 3 and permit the disc 1 to be moved into the position illustrated in Figure 3.

In connection with the various modifications of the invention described above, it will be appreciated that any desired means could be provided for ensuring that the closure element cannot be tampered with before use by an unauthorized person. Thus in Figure 1 there is illustrated, by way of example, a means of connecting the disc 1 and the member 2 by means of a seal 28 which extends through a hole 29 provided in the top disc 1 and through the slot 7 in the member 2. In another form, in place of the seal 28 there could be provided a cup-shaped element for insertion into the apertured member 2, the cup-shaped member being so constructed that it is impossible to remove it from the aperture without destroying the said member by the employment of a piercing tool.

Thus it will be seen that according to the present invention there is provided a combined closure element and valve for or use upon a liquid or like container which is simple in its construction, efficient in its operation and simple to manufacture.

What I claim as my invention and desire to secure by Letters Patent of the United States is:

1. A combined closure element and valve for, or for use upon, a liquid or like container, which comprises two sheet metal elements one element having an aperture therein and the other element comprising a disc pivotally mounted upon the said first element at a point adjacent to the periphery of the aperture and the disc so as to be movable in the plane of the disc about the said pivot into a position to cover the said aperture, and to be thereafter movable in the plane of the disc about the axis thereof, and relatively to the said first element through which the pivot extends in an arcuate slot disposed adjacent to and concentric with the aperture therein, the disc being provided at the periphery thereof with elements arranged to engage with inclined projections upon the said first element, to effect a liquid-tight engagement between the effective boundary of the aperture and the said disc.

2. A combined closure element and valve for, or for use upon, a liquid or like container, which comprises two sheet metal elements one element having an aperture therein and the other element comprising a disc pivotally mounted upon the said first element at a point adjacent to the periphery of the aperture and the disc so as to be movable in the plane of the disc about the said pivot into a position to cover the said aperture, and to be thereafter movable in the plane of the disc about the axis thereof, and relatively to the said first element through which the pivot extends in an arcuate slot disposed adjacent to and concentric with the aperture therein, the disc being provided at the periphery thereof with a pair of diametrically opposed lugs arranged to engage with inclined projections upon the said first element, to effect a liquid-tight engagement between the effective boundary of the aperture and the said disc.

3. A combined closure element and valve for, or for use upon, a liquid or like container, which comprises two sheet metal elements one element having an aperture therein and the other element comprising a disc pivotally mounted upon the said first element at a point adjacent to the periphery of the aperture and the disc so as to be movable in the plane of the disc about the said pivot into a position to cover the said aperture, and to be thereafter movable in the plane of the disc about the axis thereof, and relatively to the said first element through which the pivot extends in an arcuate slot disposed adjacent to and concentric with the aperture therein, with a U-shaped extension to said arcuate slot in which the pivot is retained during the pivotal movement, the disc being provided at the periphery thereof with elements arranged to engage with inclined projections upon the said first element, to effect a liquid-tight engagement between the effective boundary of the aperture and the said disc.

4. A combined closure element and valve for, or for use upon, a liquid or like container, which comprises two sheet metal elements one element having an aperture therein and the other element comprising a disc pivotally mounted upon the said first element at a point adjacent to the periphery of the aperture and the disc so as to be movable in the plane of the disc about the said pivot into a position to cover the said aperture, and to be thereafter movable in the plane of the disc about the axis thereof, and relatively to the said first element through which the pivot extends in an arcuate slot disposed adjacent to and concentric with the aperture therein, with a U-shaped extension to said arcuate slot in which the pivot is retained during the pivotal movement, the disc being provided at the periphery thereof with a pair of diametrically opposed lugs arranged to engage with inclined projections upon the said first element, to effect a liquid-tight engagement between the effective boundary of the aperture and the said disc.

THOMAS HENRY BRADBURY.

CERTIFICATE OF CORRECTION.

Patent No. 2,156,837.  May 2, 1939.

THOMAS HENRY BRADBURY.

It is hereby certified that the name of the assignee in the above numbered patent was erroneously described and specified as "Phillips Telescopic Tops Limited" whereas said name should have been described and specified as Phillips Telescopic Taps Limited, of London, England, a British company, as shown by the record of assignments in this office; and that the said Letters Patent should be read with this correction therein that the same may conform to the record of the case in the Patent Office.

Signed and sealed this 27th day of June, A. D. 1939.

Henry Van Arsdale (Seal)  Acting Commissioner of Patents.